July 17, 1962
C. J. SHAW
3,044,643
BOAT LOADING MEANS
Filed March 30, 1960
3 Sheets-Sheet 1
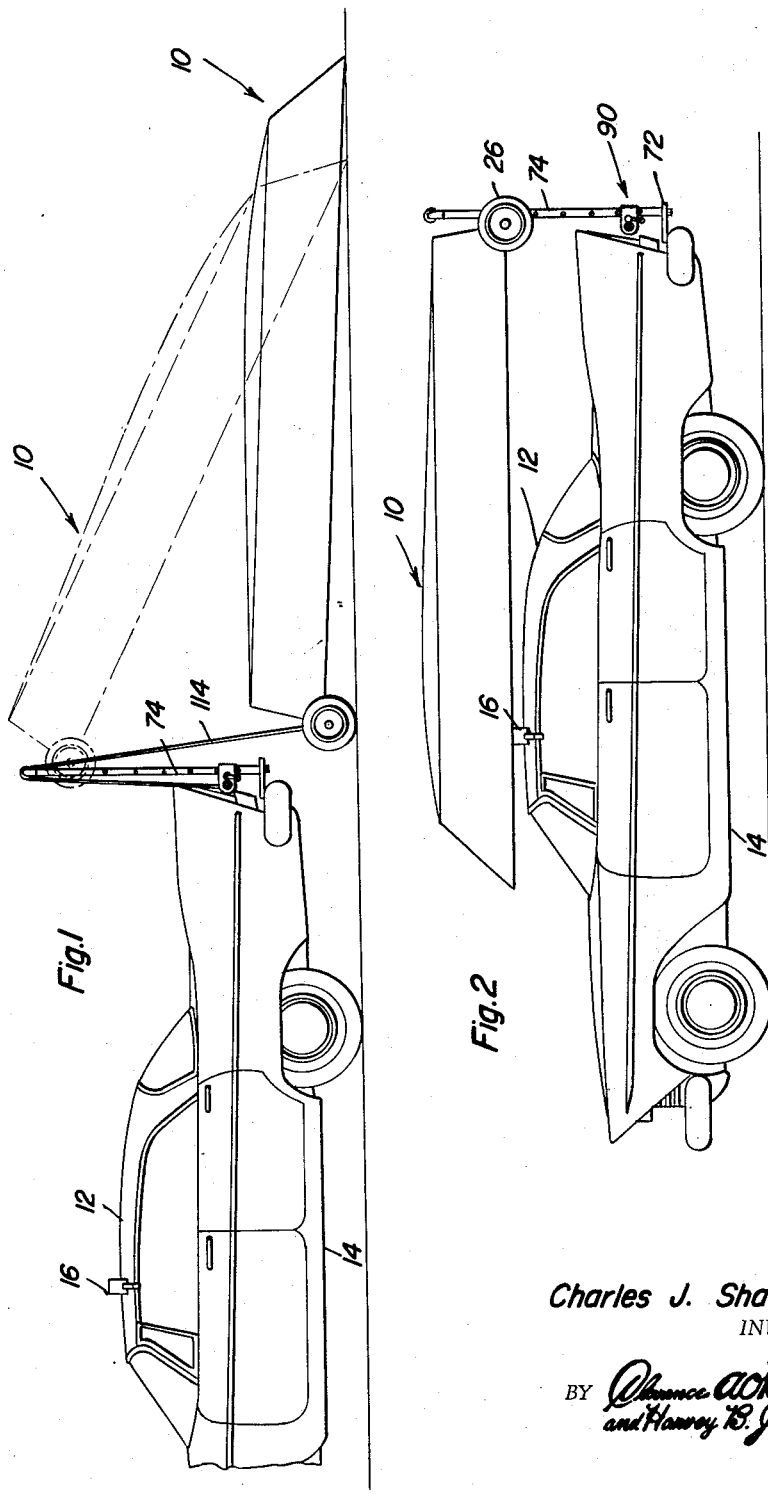
Charles J. Shaw
INVENTOR.

July 17, 1962  C. J. SHAW  3,044,643
BOAT LOADING MEANS
Filed March 30, 1960  3 Sheets-Sheet 2
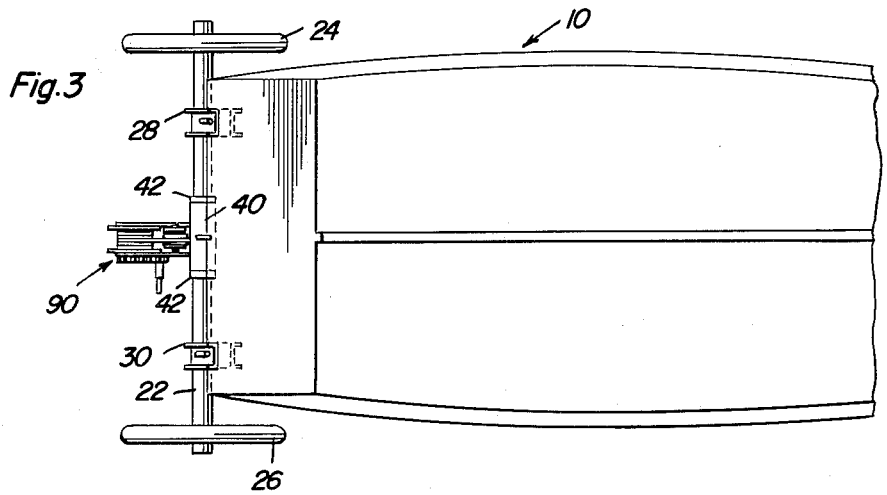
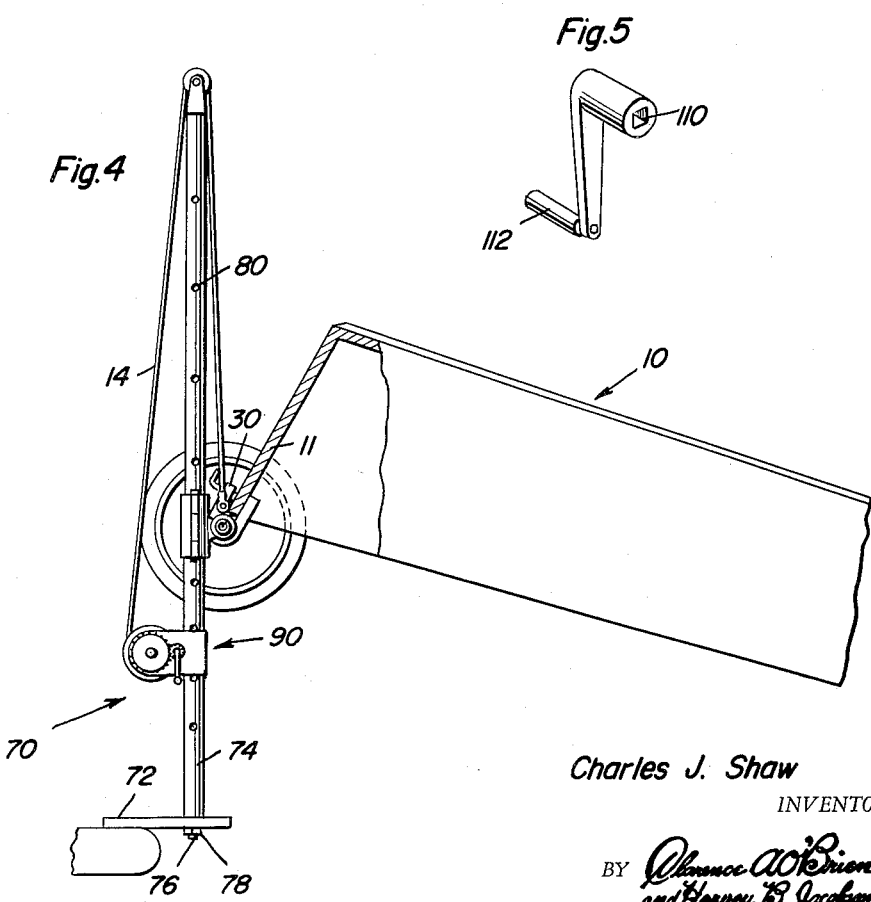
Charles J. Shaw
INVENTOR.

July 17, 1962
C. J. SHAW
3,044,643
BOAT LOADING MEANS
Filed March 30, 1960
3 Sheets-Sheet 3
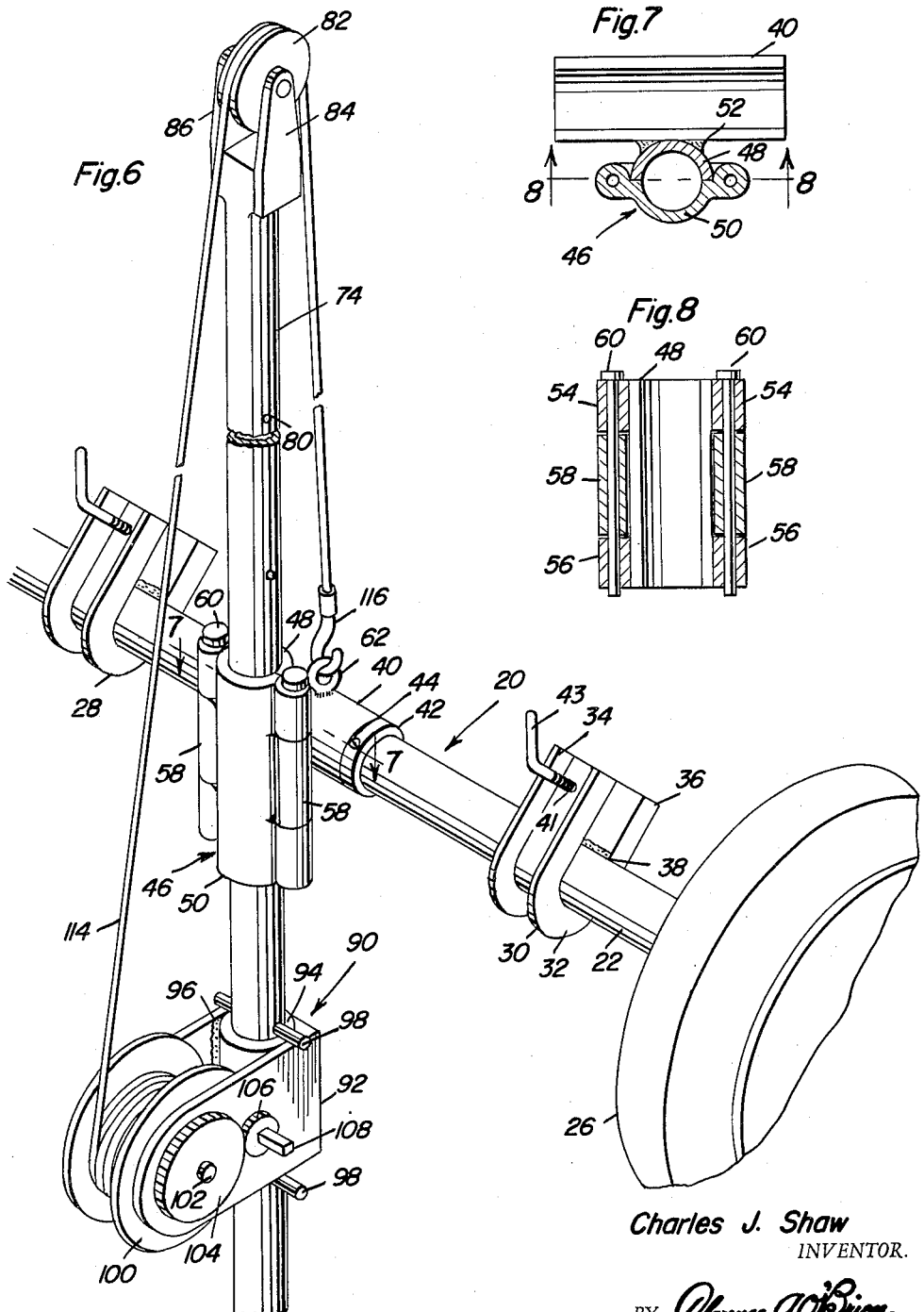
Charles J. Shaw
INVENTOR.

United States Patent Office 3,044,643
Patented July 17, 1962

1

3,044,643
BOAT LOADING MEANS
Charles J. Shaw, 1315 Fruitdale Drive, Grants Pass, Oreg.
Filed Mar. 30, 1960, Ser. No. 18,733
15 Claims. (Cl. 214—450)

This invention relates generally to boating equipment and more particularly to means for facilitating the removal of a boat from the water, facilitating the movement of a boat along a beach and facilitating the loading of a boat onto the roof of a vehicle.

In recent years, the popularity of fishing, water skiing and other water activities has increased considerably. Along with the increased popularity of water activities, new developments have been made in the boating industry. New and improved boat designs have appeared on the market and new accessories have become available. The problem of facilitating the transportation of small boats, as rowboats or run-abouts has been met by the appearance on the market of many and different types of boat trailers. Although boat trailers allow a boat to be easily transported, they necessitate additional initial expense on the part of the boat owner. Also, many drivers find that they prefer to drive to and from the shore without having to tow a trailer which, of course, necessitates that the driver drive his vehicle at lower speeds and exercise extraordinary care and caution. Many persons, accordingly, have found it to their advantage to mount small boats on the roof of their vehicle. By so doing, the additional cost of a trailer is eliminated and the additional caution required by a driver towing a trailer is not needed. However, the disadvantage of carrying a boat on the roof of an automobile is that it generally requires at least two men to place the boat on the roof and thereafter requires the expenditure of excessive time and caution in binding the boat to the roof.

In view of the above, it is the principal object of this invention to provide novel means for facilitating the removal of a boat from the water, facilitating the movement of the boat along a beach, and facilitating the loading of the boat onto the roof of an automobile.

More particularly, it is an object of this invention to provide novel boat loading means which are simple, convenient, and require only one man to load and unload the boat onto and from the roof of the automobile. The loading means provided are light in weight yet strong and durable. The cost of the loading means is relatively low and inasmuch as the loading means include relatively few moving parts, the necessity of maintenance of the loading means is insignificant.

It is a still more particular object of this invention to provide novel loading means for facilitating the loading of a boat onto an automobile roof. The loading means include two major parts; the first being a dolly for facilitating the movement of the boat from the water along the beach to the automobile, and the second part comprising elevating means in the form of a standard preferably secured proximate the rear vehicle bumper and a winch for operating a cable adapted to be connected to the dolly for lifting the boat and dolly to a desired height.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view illustrating a boat in the process of being loaded onto the roof of an automobile;

FIGURE 2 is a side elevational view illustrating the boat loaded on the roof of the automobile;

2

FIGURE 3 is a top plan view showing a boat in the process of being raised by the elevating means adapted to be carried by a vehicle;

FIGURE 4 is an elevational side view, partially broken away, of the boat and loading means illustrated in FIGURE 3;

FIGURE 5 is a perspective view of a hand crank utilized for operating the winch forming an element of the loading means;

FIGURE 6 is an enlarged fragmentary perspective view illustrating the cooperation between the elevating means and dolly;

FIGURE 7 is a horizontal sectional view taken substantially along the plane 7—7 of FIGURE 6; and FIGURE 8 is a vertical sectional view taken substantially along the plane 8—8 of FIGURE 7.

Attention is now called to the drawings wherein a conventional small boat 10 is illustrated. It is desired to load the boat 10 onto the roof 12 of the vehicle 14. A support 16 is supported on the roof 12 adjacent the forward end of the vehicle 14. The support 16 is designed to support the forward portion of the boat 10.

In order to remove the boat 10 from the water, a dolly 20 is provided. The dolly 20 includes an axle 22 which has a pair of ground wheels 24 and 26 rotatably supported therefrom. A pair of transom clamps 28 and 30 are provided. Each of the transom clamps 28 and 30 are C-shaped and define a web 32 which has a pair of spaced legs 34 and 36 projecting therefrom. The web 32 of each of the clamps 28 and 30 is welded to the axle 22 as at 38. A setscrew 41 is threaded in the leg 34 and projects toward the leg 36. A perpendicular handle portion 43 is provided on the screw 41 allowing the screw 41 to be turned more easily. When it is desired to remove the boat 10 from the water and load it on the roof 12 of the vehicle 14, it is initially necessary to beach the boat in the normal fashion. If an outboard motor has been used, it must be removed before attaching the dolly 20 to the boat 10. The boat 10 has a transom 11 which extends between the spaced legs 34 and 36 of the transom clamps 28 and 30. The axle 22 is wider than the boat 10 and extends beyond the sides thereof. Accordingly, the wheels 24 and 26 may be rotatably supported on the axle 22 outwardly of the sides of the boat 10. It will be appreciated that with the boat beached in the normal manner, the dolly will be clamped to the transom 11 above the boat with the ground wheels 24 and 26 in the air out of engagement with the ground. The setscrews 41 are utilized to clamp the dolly 20 tightly to the transom 11. The boat 10 is pulled free of the water and turned over sideways upside-down. By so doing, the ground wheels 24 and 26 engage the ground and accordingly the axle 22 supports the stern of the boat above the ground with the bow of the boat 10 resting on the beach. With the dolly so placed, the boat 10 may be picked up at the bow, by one man, and pulled or pushed, wheelbarrow fashion along the beach to the vehicle 14.

A cylindrical collar 40 is slidably received on the axle 22 between locking rings 42 which are held to the axle 22 by setscrews 44. The collar 40 is secured by the locking rings 42 at an intermediate position on the axle 22. A cylindrical sleeve 46 is secured to the collar 40. The cylindrical sleeve 46 includes a pair of semi-cylindrical sleeve sections 48 and 50. The semi-cylindrical section 48 is welded at 52 to the collar 40. The collar 40 and sleeve 46 define axes which extend at right angles to each other. The semi-cylindrical section 48 has apertured ears 54 extending therefrom and supported on the circumference thereof adjacent one end of the section 48 and apertured ears 56 aligned with the ears 54 on a second end of the section 48. The apertures defined in the ears 54 and 56 are aligned and the ears 54 and 56 are spaced from each other. The semi-cylindrical section 50 is provided with apertured ears 58 which extend therefrom on the circumference thereof intermediate the ends of the section 50. As is especially shown in FIGURES 6 and 8, the apertured ears 58 secured to the section 50 are receivable between the apertured ears 54 and 56 secured to the section 48. Pins 60 are receivable through the aligned apertures in the ears 54, 58 and 56. By removing either one of the pins 60, it will be apparent that the semi-cylindrical section 50 may pivot about the remaining pin 60 relative to the semi-cylindrical section 48 which is secured to the collar 40. A lifting ring 62 is welded to the collar 40 on the circumference thereof.

Elevating means 70 are adapted to be secured to the vehicle 14 by means of a trailer hitch 72 or similar bracket. If the user wishes to tow a trailer house the mounting bracket need not interfere with the normal trailer bar since the bracket can be installed to provide ample clearance above the trailer hitch bar. In any event, in the embodiment here disclosed, a standard 74 is provided with a reduced threaded end 76 which receives nut 78 thereon for securing the standard 74 to the hitch or bracket 72 so the standard 74 extends vertically. The standard 74 is cylindrical and defines a plurality of vertically spaced openings 80 therein. The upper end of the standard is bifurcated and a pulley 82 is rotatably supported between bifurcated portions 84 and 86. A winch 90 includes a frame 92 which has a collar 94 welded thereto at 96. The collar 94 is slidably received on the standard 74 and pins 98 are receivable through the vertically spaced openings 80 in the standard 74 to support the winch 90 at a desired vertical level. The winch 90 has a reel 100 secured to shaft 102 which, in turn, has a gear 104 fixed thereto. The gear 104 is meshed with gear 106 having a square shaft 108 adapted to be received in the square recess 110 in the hand crank 112. It will be appreciated that by placing the crank 112 on the square shaft 108, the gear 106 may be driven to rotate the gear 104, shaft 102, and reel 100. A winch cable 114 extends from the reel 100 over the pulley 82. A hook 116 is terminally fastened to the cable 114. It is contemplated that the winch 90 be provided with conventional ratchet means which permit the crank 112 to turn the square shaft 108 in one direction while preventing the reverse winding of the shaft 108 and reel 100 except upon release of the ratchet means.

In the operation of the boat loading means disclosed, the boat 10 is initially beached in the normal fashion. The dolly 20 is placed on the boat transom 11 while the boat 10 is still in upright position so that the dolly ground wheels 24 and 26 will be off the ground. The boat 10 is pulled free of the water and turned over sideways upside-down so that the dolly ground wheels 24 and 26 engage the ground with the axle 22 and transom clamps 28 and 30 supporting the stern of the boat 10 with the bow of the boat 10 resting on the beach. Inasmuch as the ground wheels 24 and 26 are engaged with the ground and rotatable on the axle 22, the boat may now be picked up, by one man, at the bow thereof and pulled or pushed, wheelbarrow fashion, to the rear of the vehicle 14. In order to load the boat 10 onto the roof 12 of the vehicle 14, the transom 11 of the boat 10 is placed as close to and as nearly parallel to the rear bumper of the vehicle 14 as is possible. At this point, one of the pins 60 should be removed from the apertured ears 54, 58 and 56 to allow the semi-cylindrical section 50 to pivot about the remaining pin 60 relative to the semi-cylindrical section 48. The hook 116 of the winch cable 114 is now engaged with the lifting ring 62 on the collar 40. The stern portion of the boat 10 with the dolly 20 attached thereto by clamps 28 and 30 is now ready to be hoisted by means of the winch 90 by manual turning of the crank 112 to turn the square shaft 108. As the crank is turned, the gear 106 drives gear 104 and turns reel 100 so as to collect and store the winch cable 114 thereon. As the boat 10 and dolly 20 are lifted by the winch 90, the sleeve 46 is elevated and moves into alignment with the cylindrical standard 74. When this alignment is complete, the semi-cylindrical sections 48 and 50 are pivoted about the pin 60 which has not been removed, to close around the standard 74. The removed pin 60 is then reinserted in the aligned apertures of the ears 54, 58 and 56. Continued turning of the crank 112 causes the dolly 20 and boat stern to travel up the standard until the desired or necessary elevation has been reached. At this point, and at any other time the crank is not being turned, ratchet means engage the gears preventing the unwinding of the reel 100. When the sleeve 46 has been raised on the standard 74 to the desired elevation, a pin is inserted through the appropriate opening 80 in the standard 74 to support the sleeve 46 and dolly 20 at the position desired. By releasing the ratchet means, the hook 116 may be disengaged from the lifting ring 62 as the movement of the reel 100 is reversed. The boat 10 is now ready to be placed on top of the vehicle 14. The operator will go to the bow of the boat 10, pick it up, and press up until the boat gunwale or side will clear support 16 secured to the car roof 12. The operator merely walks in an arcuate path toward the front of the car carrying the bow of the boat as the dolly 20 and sleeve 46 pivot about the standard 74 as an axis. The forward portion of the boat 10 is rested on the support 16 and the boat is secured to the support and is ready for traveling.

From the foregoing, it will be appreciated that simple means have been provided for enabling one person to remove a boat from the water and load it onto a vehicle in a simple and rapid manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard.

2. Means for facilitating movement of a boat along a beach and for raising it to a desired elevation as for the purpose of loading it onto a vehicle roof comprising a dolly having rotatable ground wheels, means for supporting said boat on said dolly, elevating means including a vertically extending standard, and means mounting said dolly on said standard for movement therealong and for rotation relative to said standard about its longitudinal axis whereby said boat and dolly may be elevated to said desired level and thereafter pivoted about said standard.

3. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said boat defining a transom, said dolly including an axle having a ground wheel rotatably mounted on each end thereof, and transom clamping means carried by said axle clamping said axle to said boat transom.

4. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said boat defining a transom, said dolly including an axle having a ground wheel rotatably mounted on each end thereof, and transom clamping means carried by said axle clamping said axle to said boat transom, a collar concentrically secured on said axle, and a sleeve perpendicularly fixed to said collar.

5. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said boat defining a transom, said dolly including an axle having a ground wheel rotatably mounted on each end thereof, and transom clamping means carried by said axle clamping said axle to said boat transom, a collar concentrically secured on said axle, and a sleeve perpendicularly fixed to said collar, said sleeve being cylindrical and defining a pair of semi-cylindrical pivotally associated sleeve sections.

6. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said standard centrally secured to said vehicle proximate one end thereof.

7. For use in combination with a vehicle, means for loading a boat onto said vehicle comprising a dolly having rotatable ground wheels, means for supporting said boat on said dolly an upright standard carried by said vehicle, and means mounting said dolly on said standard for movement therealong and for rotation relative to said standard about its longitudinal axis whereby said boat and dolly may be elevated to a desired level and thereafter pivoted about said standard, said standard centrally secured to said vehicle proximate one end thereof, a pulley carried by said standard on its upper end, a winch having a winch cable, said cable extending around said pulley, and means for engaging said cable with said dolly.

8. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said standard centrally secured to said vehicle proximate one end thereof, a pulley carried by said standard on its upper end, a winch having a winch cable, said cable extending around said pulley, and means for engaging said cable with said dolly, said dolly provided with a lifting ring, said cable having a hook engageable with said ring.

9. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, a transom clamping means carried by said axle clamping said axle to said boat transom.

10. For use in combination with a vehicle, means for loading a boat onto said vehicle comprising a dolly having rotatable ground wheels, means for supporting said boat on said dolly, an upright standard carried by said vehicle, and means mounting said dolly on said standard for movement therealong and for rotation relative to said standard about its longitudinal axis whereby said boat and dolly may be elevated to a desired level and thereafter pivoted about said standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, and transom clamping means carried by said axle clamping said axle to said boat transom, a sleeve carried by said axle defining said mounting means, said sleeve defining a pair of pivotally associated sleeve sections.

11. For use in combination with a vehicle, means for loading a boat onto said vehicle comprising a dolly having rotatable ground wheels, means for supporting said boat on said dolly, elevating means carried by said vehicle, and means operatively connecting said elevating means to said dolly whereby said boat and dolly may be elevated to a desired level, said elevating means comprising a vertically extending standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, and transom clamping means carried by said axle clamping said axle to said boat transom, a sleeve carried by said axle, said sleeve defining a pair of pivotally associated sleeve sections, said sleeve slidably received around said standard whereby said winch may cause the elevation of said dolly and said boat on said sleeve slides on said standard.

12. For use in combination with a vehicle, means for loading a boat onto said vehicle comprising a dolly having rotatable ground wheels, means for supporting said boat on said dolly, elevating means carried by said vehicle, and means operatively connecting said elevating means to said dolly whereby said boat and dolly may be elevated to a desired level, said elevating means comprising a vertically extending standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, and transom clamping means carried by said axle clamping said axle to said boat transom, a sleeve carried by said axle, said sleeve defining a pair of pivotally associated sleeve sections, said sleeve slidably received around said standard whereby said winch may cause the elevation of said dolly and said boat on said sleeve slides on said standard, each of said sleeve and standard being cylindrical whereby said sleeve may rotate around said standard and said boat and dolly may be pivoted about an axis defined by said standard.

13. For use in combination with a vehicle, means for loading a boat onto said vehicle comprising a dolly having rotatable ground wheels, means for supporting said boat on said dolly, elevating means carried by said vehicle, and means operatively connecting said elevating means to said dolly whereby said boat and dolly may be elevated to a desired level, said elevating means comprising a vertically extending standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, and transom clamping means carried by said axle clamping said axle to said boat transom, a sleeve carried by said axle, said sleeve defining a pair of pivotally associated sleeve sections, said sleeve slidably received around said standard whereby said winch may cause the elevation of said dolly and said boat on said sleeve slides on said standard, each of said sleeve and standard being cylindrical whereby said sleeve may rotate around said standard and said boat and dolly may be pivoted about an axis defined by said standard, said standard defining vertically spaced transverse openings extending therethrough, and pins receivable in said openings for supporting said sleeve on said standard at desired levels.

14. For use in combination with a vehicle, means for loading a boat onto said vehicle comprising a dolly having rotatable ground wheels, means for supporting said boat on said dolly, elevating means carried by said vehicle, and means operatively connecting said elevating means to said dolly whereby said boat and dolly may be elevated to a desired level, said elevating means comprising a vertically extending standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, and transom clamping means carried by said axle clamping said axle to said boat transom, a sleeve carried by said axle, said sleeve defining a pair of pivotally associated sleeve sections, said sleeve slidably received around said standard whereby said winch may cause the elevation of said dolly and said boat on said sleeve slides on said standard, each of said sleeve and standard being cylindrical whereby said sleeve may rotate around said standard and said boat and dolly may be pivoted around an axis defined by said standard, said winch including ratchet means.

15. For use in combination with a vehicle, means for loading a boat onto said vehicle comprising a dolly having rotatable ground wheels, means for supporting said boat on said dolly, elevating means carried by said vehicle, and means operatively connecting said elevating means to said dolly whereby said boat and dolly may be elevated to a desired level, said elevating means comprising a vertically extending standard, said standard centrally secured to said vehicle proximate one end thereof, a pulley carried by said standard on its upper end, a winch having a winch cable, said cable extending around said pulley, and means for engaging said cable with said dolly, said boat defining a transom, said dolly including an axle having a ground wheel rotatably mounted on each end thereof, a transom clamping means carried by said axle clamping said axle to said boat transom, a sleeve carried by said axle, said sleeve defining a pair of pivotally associated sleeve sections, said sleeve slidably received around said standard whereby said winch may cause the elevation of said dolly and said boat on said sleeve slides on said standard, each of said sleeve and standard being cylindrical whereby said sleeve may rotate around said standard and said boat and dolly may be pivoted about an axis defined by said standard, said standard defining vertically spaced transverse openings extending therethrough, and pins receivable in said openings for supporting said sleeve on said standard at desired levels, said winch including ratchet means.

References Cited in the file of this patent

UNITED STATES PATENTS 2,889,950    Grimshaw    June 9, 1959

FOREIGN PATENTS 23,176    Great Britain    Oct. 14, 1914